No. 677,500. Patented July 2, 1901.
J. P. CLEAL.
CASH REGISTER.
(Application filed Oct. 11, 1897.)

(No Model.) 5 Sheets—Sheet 1.

WITNESSES:
Wm. McCarthy
Ira Berkstresser

INVENTOR.
Joseph P. Cleal,
BY Alvan Macauley
ATTORNEY

No. 677,500. Patented July 2, 1901.
J. P. CLEAL.
CASH REGISTER.
(Application filed Oct. 11, 1897.)
(No Model.) 5 Sheets—Sheet 2.

WITNESSES:
Wm McCarthy
Ira Berkstresser

INVENTOR.
Joseph P. Cleal
BY Alvan Macauley
ATTORNEY.

No. 677,500. Patented July 2, 1901.
J. P. CLEAL.
CASH REGISTER.
(Application filed Oct. 11, 1897.)
(No Model.) 5 Sheets—Sheet 3.

WITNESSES:
Wm. McCarthy
Ira Bukitman

INVENTOR.
Joseph P. Cleal
BY Alvan Macauley.
ATTORNEY.

No. 677,500. Patented July 2, 1901.
J. P. CLEAL.
CASH REGISTER.
(Application filed Oct. 11, 1897.)
(No Model.) 5 Sheets—Sheet 4.
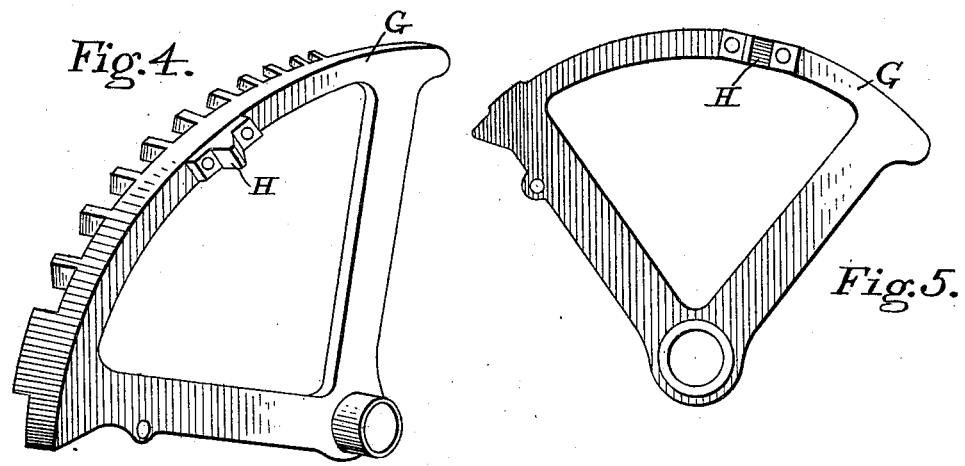
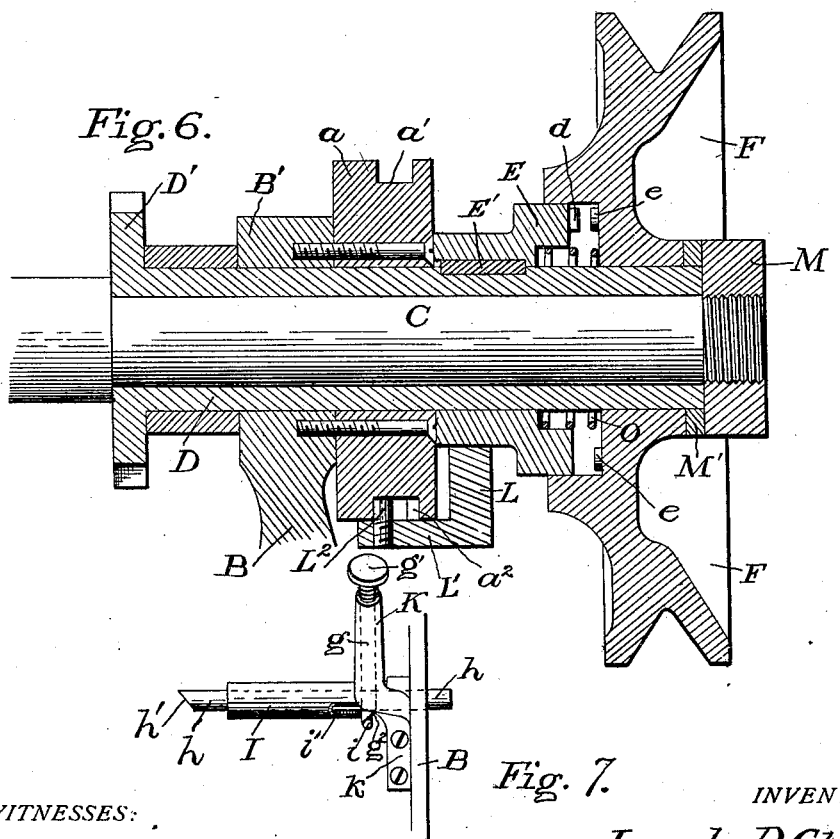
WITNESSES:
Wm McCarthy
Ira Bukstrum
INVENTOR.
Joseph P. Cleal.
BY Alvan Macauley
ATTORNEY No. 677,500. Patented July 2, 1901.
J. P. CLEAL.
CASH REGISTER.
(Application filed Oct. 11, 1897.)
(No Model.) 5 Sheets—Sheet 5.

Witnesses
W. McCarthy
Wm H. Suggy

Inventor
Joseph P Cleal
By Alvan Macauley
Attorney

THE NORRIS PETERS CO., PHOTO-LITHO., WASHINGTON, D. C.

UNITED STATES PATENT OFFICE.

JOSEPH P. CLEAL, OF DAYTON, OHIO, ASSIGNOR, BY MESNE ASSIGNMENTS, TO THE NATIONAL CASH REGISTER COMPANY, OF JERSEY CITY, NEW JERSEY.

CASH-REGISTER.

SPECIFICATION forming part of Letters Patent No. 677,500, dated July 2, 1901.

Application filed October 11, 1897. Serial No. 654,795. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers; and I do hereby declare the following to be a full, clear, and exact description of the invention.

My invention relates to an attachment for registering-machines or the like, its principal object being to obviate the necessity of manually actuating the operating mechanism by a crank or otherwise by adapting such machines to be effectively operated from an electric motor or other suitable source of power.

As illustrated, my invention is applied to a cash-registering machine such as is disclosed in Patent No. 580,378, granted to Messrs. Cleal and Reinhard April 13, 1897.

Figure 1:
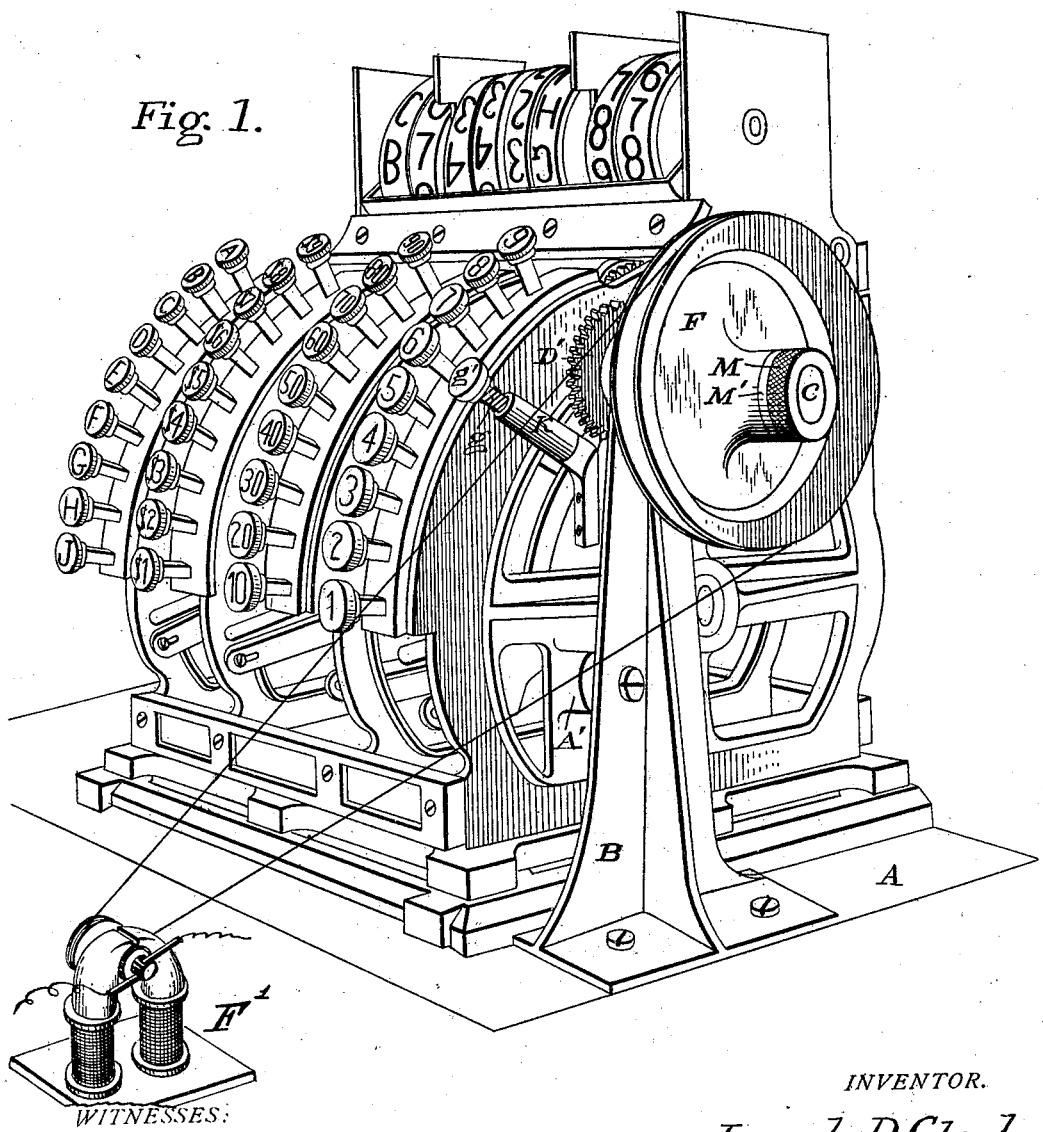
Figure 2:
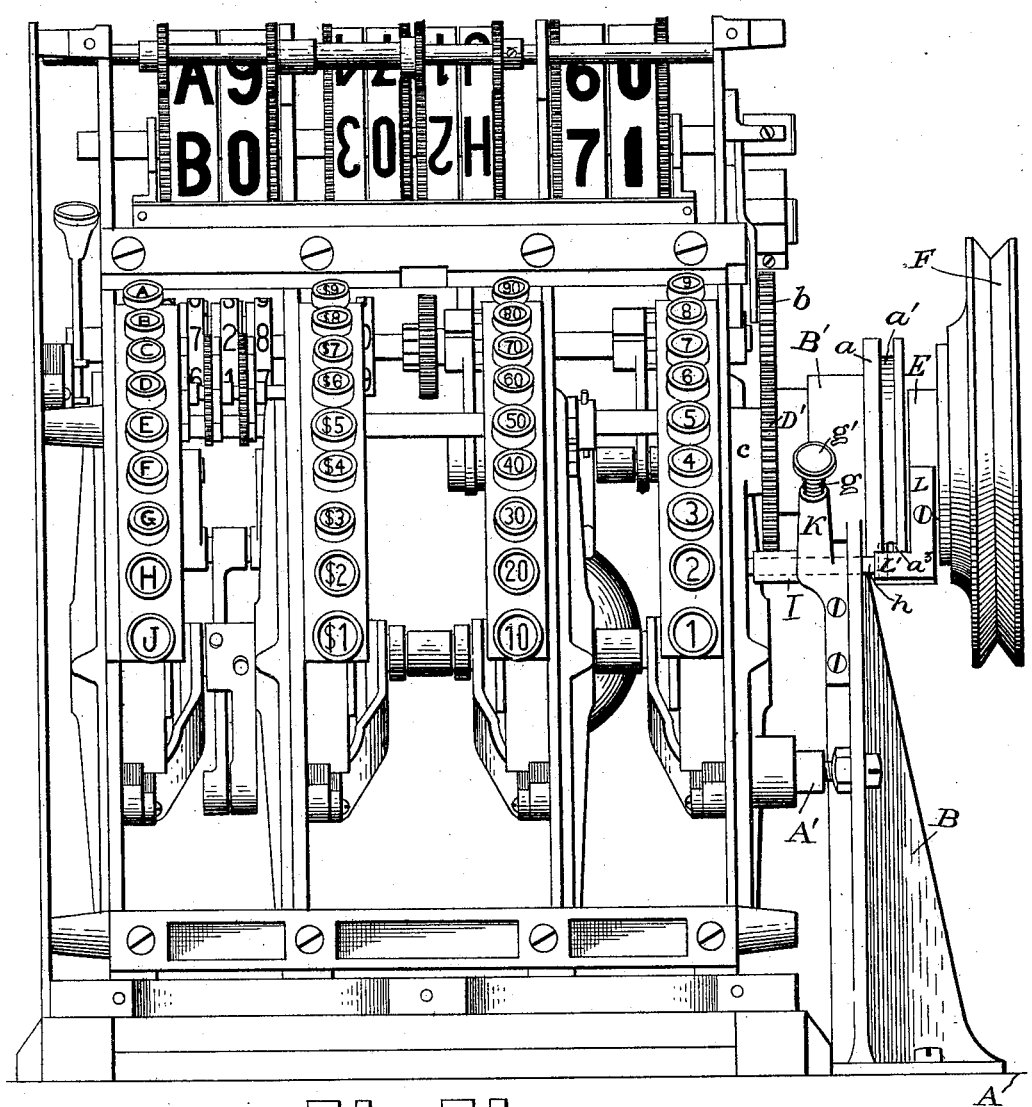
Figure 8:
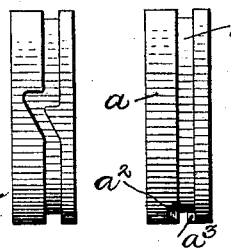
Figure 3:
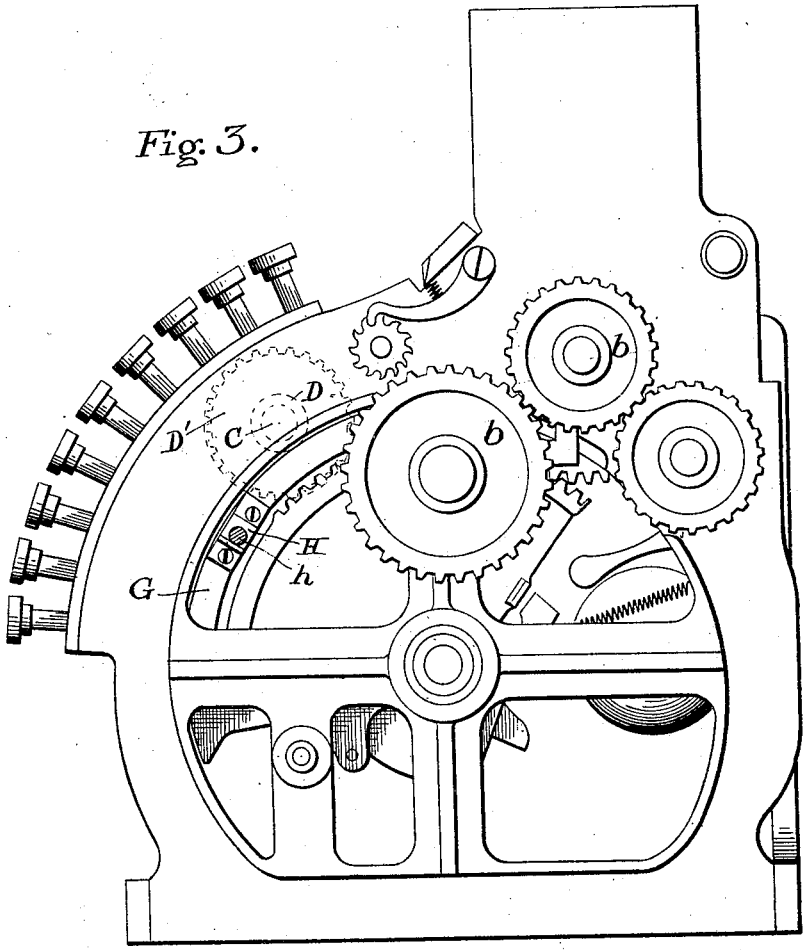
Figure 9:
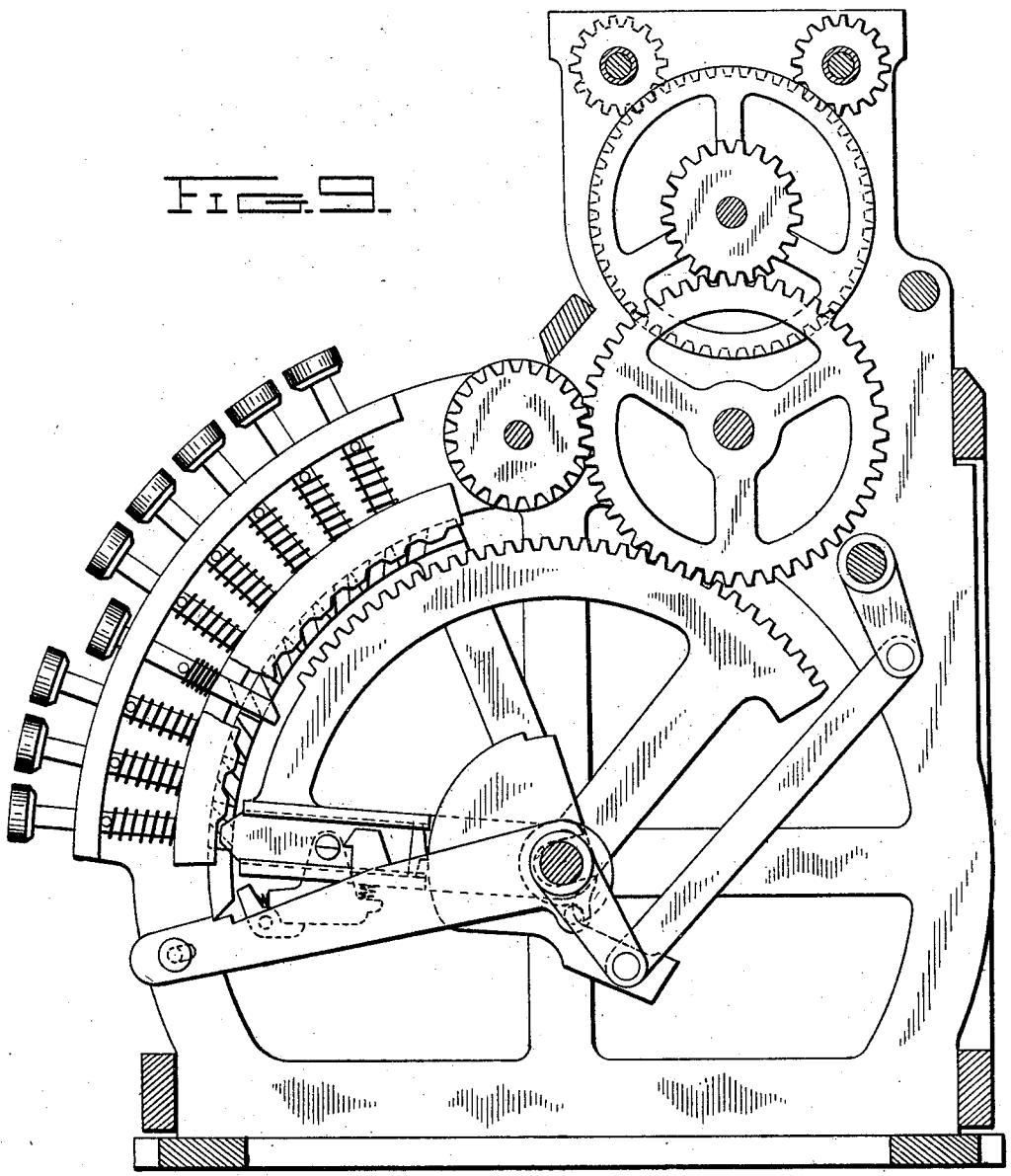

Figure 1 of the drawings is a perspective view of my invention attached to a machine of the character stated; Fig. 2, a front elevation of the same; and Fig. 3, a side or end view of the cash-registering machine, showing only a portion of my improvements annexed. Figs. 4, 5, 6, and 7 are detail views. Fig. 8 shows two views of a grooved disk hereinafter referred to, and Fig. 9 represents a central vertical section through the type of machine to which I have applied my invention.

The same letters of reference are used to indicate identical parts throughout the various illustrations.

Rigidly secured to the base A of the register and at A' to one end of its frame is an upright support B, extending up to a point near the register gear-wheels $b\ b$, and provided at its upper end with a suitable bearing-ring B', to which, on the right-hand side, is fast secured another ring $a$, having a continuous groove $a'$ around its periphery. A shaft C, (see Fig. 6,) carrying a movable sleeve D, is secured rigidly to the right-hand end of the register-frame and from thence extends outwardly through the bearing B' and some distance beyond the support B. The sleeve D covers substantially the entire length of shaft C and at its inner end carries a gear D', secured fast thereto, which meshes with a register gear-wheel $b$, which is one of the driving-gears. On sleeve D, adjacent to grooved ring $a$, is a sliding annular clutch E, having a stud $d$ on its outer edge adapted to engage studs $e\ e$ on the inner face of a pulley F, mounted on the sleeve D, near its outer end. The clutch is prevented from independent rotary movement on sleeve D by a spline-and-feather connection E'. When the clutch is slid away from the pulley F and their respective studs $d$ and $e$ are out of engagement, the pulley is adapted to rotate independently on the sleeve D as its axis; but when the clutch is thrown into engagement with the pulley the sleeve D will be turned on the shaft C and the gear D' will actuate the driving-gear B to actuate the entire registering mechanism. A nut M and washer M' on shaft C are employed to hold the pulley F in place on the outer end of sleeve D. The means for throwing the pulley F into operative connection with the register driving-gears $b$ are specially illustrated in Figs. 2, 3, 4, 5, and 7 of the drawings. The detent-plate G, which is usual in the type of cash-register to which my invention is shown as applied, coöperates with the register-keys of the "cents-bank." In carrying out my invention this detent is provided with a beveled lug H on its outer edge. Secured to the upright support B, substantially in alinement with the beveled lug H, is a bracket $k$, secured to and supported by which are two cylindrical sockets I and K, extending at right angles to each other. Within socket K is a clutch-operating plunger $g$, having at its outer end a head $g'$, substantially in the plane of the register-key cups or heads, its inner end being beveled at $g^2$ and adapted when force is applied to the clutch-operating plunger to actuate a slide $h$ in horizontal socket I. A pin or stud $i$, secured to and carried by plunger $h$, projects through a slot $i'$ in socket I and rests normally against the beveled end of plunger $g$. The inner end of slide $h$ is also beveled at $h'$ and is held normally against beveled lug H on the register detent-plate G. The outer end of horizontal sliding rod $h$ extends through an orifice in standard B to a point under the grooved ring $a$. (See Fig. 2.)

To the sliding clutch E is screwed or otherwise rigidly secured a bracket L, having an arm L' extending horizontally and over the groove $a'$ in ring $a$ and normally in contact with the outer end of sliding rod $h$. On the inner face of arm L' is a pin or stud $L^2$, projecting into and adapted to ride in groove $a'$. Said stud travels the length of said groove at each complete revolution of the sleeve D—that is, every time the clutch is thrown into engagement. It will be noticed that there is a deflection $a^2$ in the groove $a$, and the stud $L^2$ normally rests in the deflection. When the slide $h$ is forced to the right, it slides the clutch into engagement and moves the stud out of the deflection into the groove $a$. The clutch is automatically thrown out of engagement by the stud riding into the deflection just at the end of the revolution of the clutch. This is accomplished by a spring O, interposed between the clutch E and pulley F, which tends to force the clutch out of operative connection with the pulley and toward the ring $a$, and also by a lug $a^3$, located on the side of groove $a'$ opposite deflection $a^2$ and having a straight abrupt face and an inclined face, and stud $L^2$, riding up the said inclined face, and thus being pushed into the deflection, thereby serving to slide the clutch free from the pulley F.

The practical operation of my invention may be stated as follows: A belt, either of electric motor F', a line-shaft, or any other desired source of power, is applied to the pulley F, and the latter therefore runs constantly until of course the power is shut off. To operate the register, the clutch E must be slid on the sleeve D against the pulley F, so that the stud $d$ on the clutch will interlock with one of the studs $e$, carried by the pulley. This may be accomplished in either of two ways, the method depending upon the amount to be registered. If the registration is to be one of even dimes—as, for example, thirty cents—I press the "30¢" key and then the plunger $g$. The beveled end $g^2$ of the plunger acting against the pin $i$ of the slide H forces the latter to the right. The slide in turn moves the clutch on the sleeve D and into engagement with the pulley, and thereupon the sleeve is given a complete revolution, and its motion is transmitted through the gear D' to the driving-gears $b$ of the register. If the amount to be registered involves the use of any key in the first or cents bank, it is not necessary to use the plunger $g$ at all, for if any one of the keys in the first bank be pressed the machine is caused to operate at once. For this reason it is necessary to register amounts from left to right. For example, if the amount to be registered is seven dollars and fifty-three cents I first press the "$7" key in the third bank, then the "50¢" key in the second bank, and last the "3¢" key in the first or cents bank. When any key in the cents-bank is pressed, it causes a slight upward movement of the detent G, which causes the slide $h$ to ride up the inclined face of the stud H, which is carried by the detent.

This forces the slide $h$ to the right and throws the clutch into operative engagement, just as described with respect to the plunger $g$.

As I am the first in the art to construct a cash-register that may be thrown into engagement with a source of power by pressure of any one of a series of keys, I do not wish to be limited to the construction shown in which any one of a series of ten keys, including the nine keys of the cents-bank and the plunger $g$, are arranged to connect up with the source of power to operate the register. When the registration is complete, the machine automatically throws itself out of engagement.

I claim as my invention—

1. In a cash-register, the combination with the registering mechanism, of a continuously-moving power device, means for establishing an operative relation between said registering mechanism and said power device, a series of keys representing low denominations and arranged to control both the registering mechanism and said means and a second series of keys representing higher denominations and arranged to control the register mechanism only.

2. In a cash-register, the combination with the registering mechanism, of a continuously-moving power device, a series of keys representing cents, a second series of keys representing higher denominations and clutch means controlled only by the cent-keys for throwing on the power device.

3. In a cash-register, the combination with a registering mechanism, of a continuously-moving power device, a series of keys for controlling the registering mechanism, a detent-plate coöperating with a part only of said keys, a normally inoperative clutch between the registering mechanism and the power device and means connecting the detent-plate and said clutch.

4. In a cash-register, the combination with a registering mechanism, of a series of keys representing cents, a second series of keys of higher denominations, a continuously-moving pulley, a clutch interposed between the pulley and the registering mechanism, and devices actuated only by the series of keys representing cents for operating the clutch to establish an operative relation between the pulley and registering mechanism.

5. The combination with a registering mechanism, of a series of keys for controlling the same, a normally inoperative clutch between the registering mechanism and a power device, a movable member coöperating with the keys for bringing the power device into connection with the registering mechanism when said keys are operated and means independent of said keys for actuating said movable member to operate the clutch.

6. In a cash-register, the combination with a registering mechanism, a power-wheel, a power-sleeve, a clutch between said wheel and sleeve, means for operating said clutch and a stationary grooved ring arranged to engage a projection of said clutch to cause the latter to be operated during a full revolution of the power-wheel and then be released.

7. In a cash-register, the combination with a registering mechanism, of a shaft, a power-sleeve on said shaft, a power-wheel loose on said sleeve, a movable clutch between said sleeve and wheel, a stationary ring having an annular groove formed with an offset, a projection on the clutch extending into said annular groove and normally lying in the offset thereof and means for forcing said clutch forward and the projection out of said offset so that the latter will travel in the annular groove.

8. In a cash-register, the combination with a registering mechanism, of a power device, a normally inoperative connection between said mechanism and device, registering-keys arranged to set said connecting means for operation, and devices independent of said keys for setting said connecting means.

9. In a cash-register, the combination with a registering mechanism, of a series of keys, a power device, a clutch for connecting said power device and registering mechanism, a sliding bar for operating said clutch, means connecting said bar to the keys and independent means for moving said bar.

In testimony whereof I affix my signature in presence of two witnesses.

JOSEPH P. CLEAL.

Witnesses:
PEARL N. SIGLER,
ALVAN MACAULEY.